United States Patent [19]

Wydra

[11] Patent Number: 4,817,348
[45] Date of Patent: Apr. 4, 1989

[54] DUCT FORMING SLEEVE ASSEMBLY

[76] Inventor: Richard A. Wydra, 10025 Lakeview Ct., Palos Park, Ill. 60464

[21] Appl. No.: 63,674

[22] Filed: Jun. 19, 1987

[51] Int. Cl.$^4$ ............................................. E04B 5/48
[52] U.S. Cl. ....................................... 52/220; 52/707; 285/64
[58] Field of Search .................. 52/220, 221, 707; 285/64

[56] References Cited

U.S. PATENT DOCUMENTS

| | | | |
|---|---|---|---|
| 3,009,167 | 11/1961 | Leonard | 285/64 |
| 3,810,339 | 5/1974 | Russo | 52/707 |
| 4,272,643 | 6/1981 | Carroll | 52/221 |

FOREIGN PATENT DOCUMENTS 579721  7/1959  Canada .................. 52/220

*Primary Examiner*—Henry E. Raduazo
*Attorney, Agent, or Firm*—Thomas R. Vigil

[57] ABSTRACT

The duct forming sleeve assembly is used in a process for providing passageways in concrete structures for routing of pipes, cables or conduits therethrough. The assembly comprises a rectangular base plate member which is positioned within the concrete in a plane parallel to a surface of the concrete and attached to a wooden or metal floor deck, prior to pouring the concrete. The base plate has screw holes used for mounting the base plate to the deck and is provided with a plurality of cutout areas each of which is capable of accepting a cylindrical sleeve member therein. A plurality of cylindrical rigid sleeve members, equal to the number of cutout areas within the base plate are received in the cutout areas of the base plate along an axis which is perpendicular to the plane of the base plate.

A reinforcing rod system, comprising a plurality of elongate metal rods welded at points along their length to each of the plurality of sleeve members at an identical position on each of the sleeve members is also provided.

The method for utilizing the duct forming sleeve assembly described above comprises the steps of: constructing a concrete form by arranging forming frame members into a framework; placing the duct forming sleeve assemblies at predetermined positions along the framework and attaching each assembly to the forming frame members; and pouring the concrete into the framework.

23 Claims, 2 Drawing Sheets

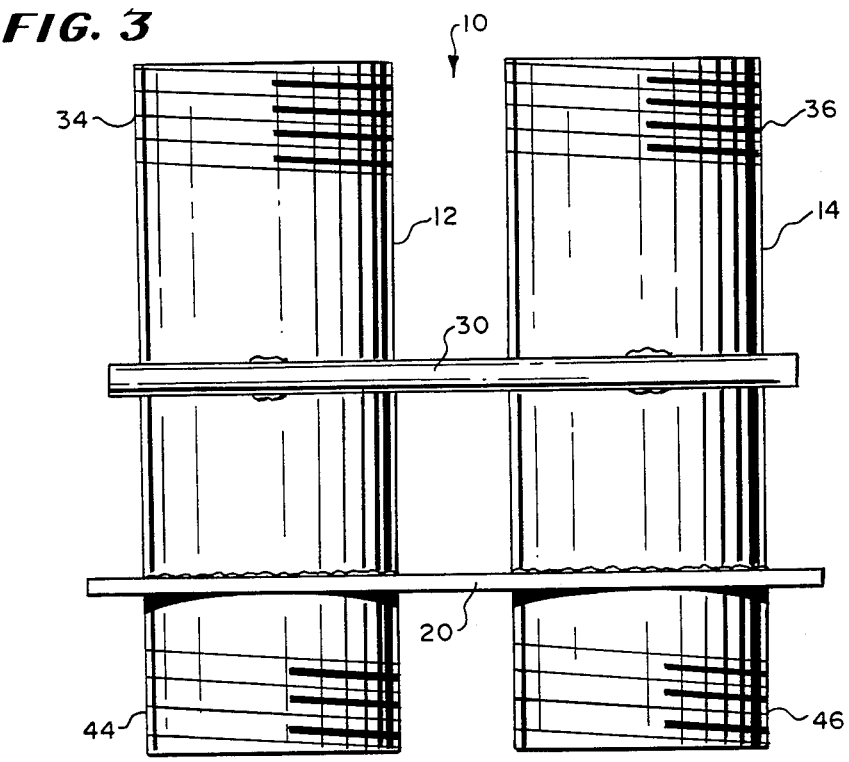
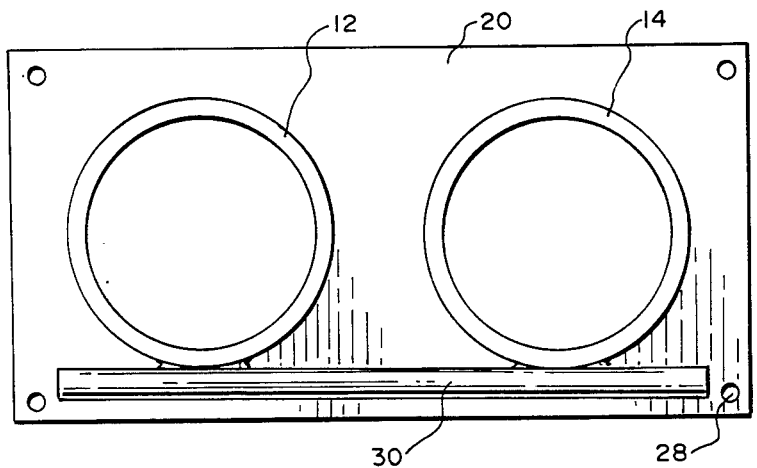
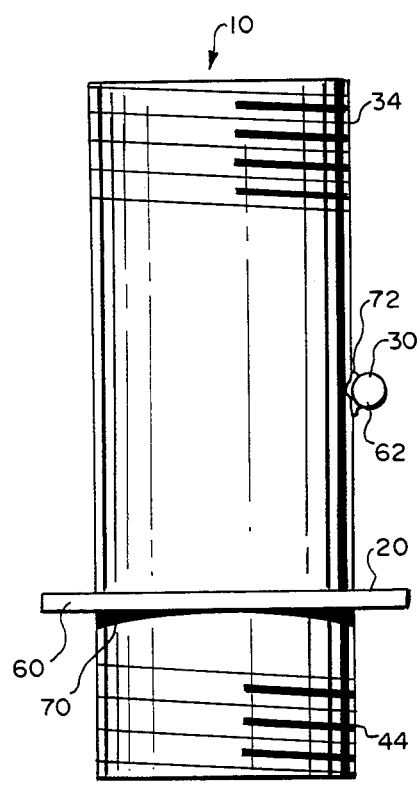

DUCT FORMING SLEEVE ASSEMBLY

BACKGROUND OF THE INVENTION

1. Field of the Invention

The present invention relates to an assembly for use in a method of providing passageways in concrete structures for routing pipes, cables and conduits therethrough.

More particularly, the present invention relates a preassembled assembly comprising a plurality of duct forming sleeves or cylinders which are reinforced by a perpendicular base plate welded thereto and by a rod or rods welded across and perpendicular to the sleeves to maintain the sleeve assembly unitary and to provide means for joining the assembly to a reinforcing metal grid system or grounding system within the concrete slab.

2. Description of the Prior Art

Heretofore, various apparatus have been proposed for forming a passageway or duct in a concrete structure, such as a foundation or wall for routing pipes and/or cables therethrough. Examples of several such apparatus are disclosed in the following U.S. patents:

| U.S. PAT. NO. | PATENT |
|---|---|
| 2,497,058 | Reid |
| 3,205,634 | Wagner |
| 3,908,323 | Stout |
| 4,071,267 | Davis |
| 4,075,803 | Alesi, Jr. |
| 4,170,853 | Kohaut |

The U.S. Pat. No. 2,497,058 to Ried, discloses a paper tube assembly for concrete construction which forms internal cavities in the concrete structure and which includes a cylindrical paper tube fitted with end caps and supported by transverse spacer plates. The assembly is restrained against endwise movement by terminal end plates. The spacer plates and terminal end plates are provided with holes in each of the corners thereof for receipt of alignment rods therethrough.

The U.S. Pat. No. 3,205,634 to Wagner, discloses a post sleeve apparatus adapted for use in the forming of concrete foundations to faciliate the erection of structures therein by inserting posts or legs within the sleeve. The apparatus comprises a cylindrical shell, a bottom cover permanently attached to the lower opening of the shell, and a removable cover member which fits snugly into the upper opening of the shell. The removable cover is provided to prevent the flow of concrete into the tubular body.

The U.S. Pat. No. 4,170,853 to Kohaut, discloses a reuseable void forming device comprising an insert for forming a preset void in a floor, wall or other structural member. The insert comprises an elongate tubular body having a length which is less than the thickness of the structure within which it is to be encapsulated, a top cap or plate, and a bottom cap or plate. Both plates are provided with apertures or slots for passage therethrough of any desired conventional fastening means. The top cap plate is located at the upper open end of the tubular body in order to prevent the flow of concrete into the tubular body.

The U.S. Pat. No. 4,071,267 to Davis, discloses a shrouded pipe wall casting for use with split clamp couplings to provide a piping wall casting which comprises a cylindrical pipe barrel and an annular shroud having a mounting flange attached to and surrounding an open end of the pipe in order to facilitate mounting of the assembly by the flange.

The U.S. Pat. No. 3,903,323 to Stout, discloses a void creating device which is embedded in concrete structures to provide passageways within the concrete structure. The device comprises two interfitting sections, which, when fitted together, form a generally elongate hollow member of generally rectangular cross-section, closed at its opposite ends, and one or more pairs of opposed tubular projections having closure baffles at each of their ends. The baffles may be removed to enable the passage of service lines therethrough.

The U.S. Pat. No. 4,075,803 to Alesi, Jr. discloses a split duct terminator for terminating a plurality of subterranean cables. The terminator comprises a plurality of modular members each including a pair of longitudinally extending opposing walls and having at least one pair of mutually coextensive module interfacing edges which lie in a common module element interface plate that intersects the wall elements. A plurality of symmetrical, longitudinally spaced, parallel channels or pipes extend between opposing wall elements. The edges of the channel elements lie in the modular element interface plate and define a plurality of longitudinally spaced apart open channels, concave with respect to the modular element interface plate, and the longitudinal spacing between the channel elements defines symmetrical openings therebetween. The framework created by the assembled modules has passageways formed by the adjacent channels in the members which extend between the walls. The modules are used in the reconstruction of a concrete manhole.

As will be disclosed in greater detail hereinafter, the preassembled duct forming sleeve assembly of the present invention differs from those disclosed in the prior art by providing parallel metallic sleeves or cylinders which extend perpendicularly to a square or rectangular base plate and which are adapted to form passageways in concrete floors for routing of pipes or cables therethrough. Each corner of the base plate is provided with a screw bore or hole which is adapted to receive a nail or screw therethrough so that the base plate and sleeves can be mounted to the framework of a floor in order that the assembly remain in a preselected position during the process of pouring concrete into the framework. Reinforcing rod elements are also provided and are welded across and perpendicular to the sleeves to provide rigidity to the assembly and may be used to tie the assembly into the reinforcing and grounding system of the floor. Since the assembly is preassembled, and can be of varied dimensions, according to the specifications required, it is easy to install and may be installed by a forming crew rather than by electricians, as is typically the case, thus providing a cost and time effectiveness. Further, because the sleeves may be capped, the assembly has an added feature of being fire stopped to prevent the spread of fire therethrough.

SUMMARY OF THE INVENTION

According to the invention there is provided a duct forming sleeve assembly for use in a process for providing passageways in concrete structures for routing of pipes, cables or conduits therethrough comprising:

a rectangular base plate member which is positioned within the concrete in a plane parallel to a surface of the concrete for attachment to a wooden or metal floor deck prior to the concrete pouring process, said base plate being provided with mounting means and further being provided with a plurality of cutout areas each of which is capable of accepting a cylindrical sleeve member therein;

a plurality of cylindrical rigid sleeve members, equal to the number of cutout areas within the base plate, each sleeve member being received in a cutout area of said base plate along an axis which is perpendicular to the plane of the base plate; and a reinforcing rod system, comprising a plurality of elongate metal rods, each rod having a length greater than the distance between at least two cylindrical sleeves in a line plus the diameters of those sleeves, said rods being welded at points along their length to each of the at least two sleeve members at an identical position on each of said at least two sleeve member.

Further according to the invention there is provided a method utilizing a duct forming sleeve assembly described above comprising the steps of:

constructing a concrete form by arranging forming frame members into a framework;

placing the duct forming sleeve assemblies at predetermined positions along the framework and attaching each assembly to the forming frame members; and pouring the concrete into the framework.

BRIEF DESCRIPTION OF THE DRAWINGS

FIG. 3 is a side view of two duct forming sleeves of the present invention, shows threaded ends which may be provided on each of the sleeves for receiving metallic bushings thereon, shows one reinforcing rod welded to the sleeves, and shows the positioning of the base plate relative to the sleeves and reinforcing rod.

FIG. 4 is a top plan view of the duct forming sleeve assembly shown in FIG. 3, shows two sleeves which are joined together by a reinforcing rod welded across and perpendicular to the sleeves and shows the base plate as having a hole at each corner thereof.

FIG. 5 is an end view of the duct forming sleeve assembly shown in FIG. 3, shows a reinforcing rod welded at a particular point thereon, and shows the positioning of the base plate slightly above a lower end edge of the sleeve.

DESCRIPTION OF THE PREFERRED EMBODIMENT

Figure 1:
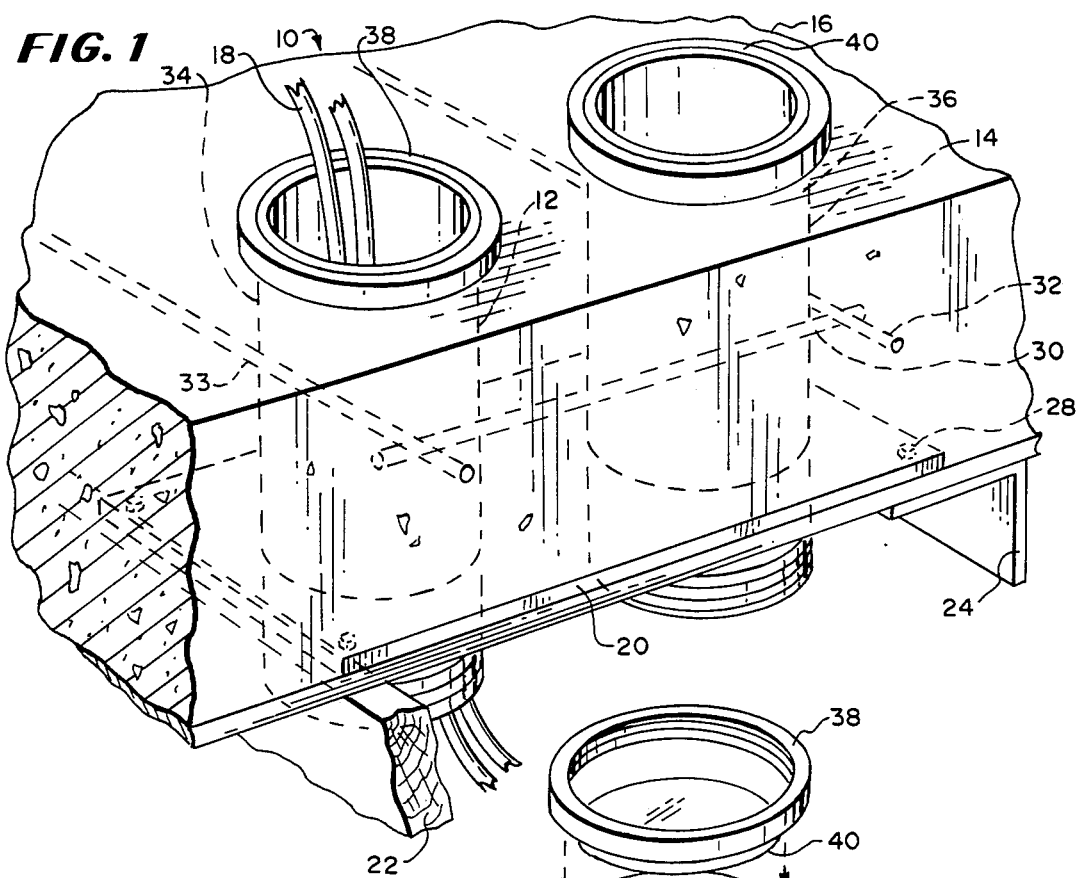
FIG. 1 is a perspective view of the duct forming sleeve assembly of the present invention and shows the positioning of the assembly within a block of cement, such as for a floor.

Referring now to the drawings in greater detail, there is illustrated in FIG. 1 a duct forming sleeve assembly constructed according to the teachings of the present invention and generally identified by the reference numeral 10. As illustrated in FIG. 1, the duct forming sleeve assembly 10 comprises two cylindrical sleeve members 12 and 14 which are embedded within a block or foundation of concrete 16. Exiting from either end of one of the sleeves 12 are illustrated electrical or other such conduits 18, to show the functionality of the duct forming sleeve assembly 10. It can be seen from FIG. 1, that a base member 20 of the assembly 10 joins the two sleeve members 12 and 14 and lies in a plane which is transverse to the plane of the sleeve members 12 and 14. This base member 20 can be attached to a forming frame member 22 or a metal footing-type member 24 provided below the layer of concrete 16 within which the sleeve assembly 10 is to be embedded to provide ducts in the concrete for passage of conduits 18 therethrough.

Such joining of the base plate 20 to either support member 22 or 24 is accomplished by use of screw bores or holes 28 provided in the base plate member 20, with a screw or nail (not shown) passing through the bore 28 and firmly attaching the base plate 20 to the support member 22 or 24.

Also as illustrated, a bracing rod system 29 comprising at least one rod, and preferably, as shown, a plurality bracing or reinforcing rods 30, 32, 34 provided in conjunction with the sleeve members 12 and 14 in a plane parallel to the plane in which the base member 20 lies.

As further shown in FIG. 1, the sleeve members 12 and 14, at their upper end 34 and 36, respectively, are each provided with a metallic bushing 38, the structure and function of which will be defined in greater detail hereinafter.

Figure 2:
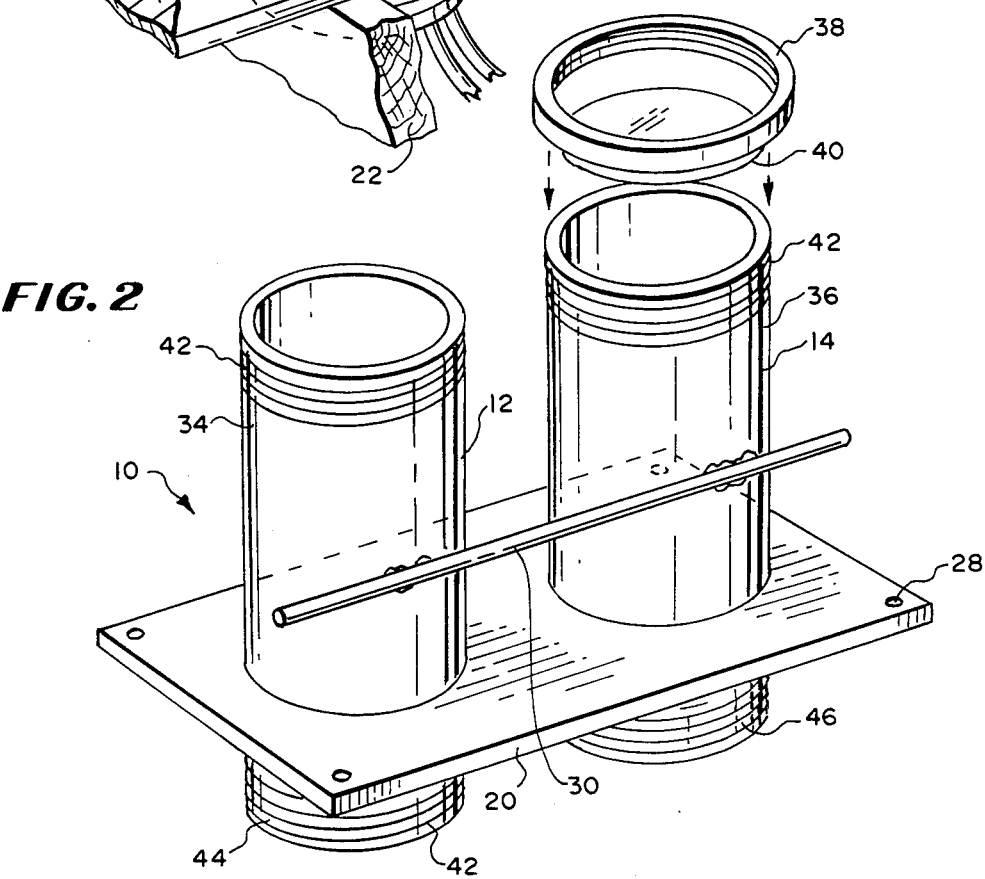
FIG. 2 is a perspective view of two duct forming sleeves of the assembly shown in FIG. 1 within a base member, shows metallic bushings attached to a top open end of the duct forming sleeves, and shows a reinforcing rod welded across and perpendicular to the pair of sleeves illustrated.

The duct forming sleeve assembly 10 of the present invention is better illustrated in FIG. 2. As shown more clearly in this Figure, in a preferred embodiment, the two sleeve members 12 and 14 of the assembly 10 may be provided with threading 42 on their respective upper ends 34 and 36, as well as on their lower ends 44 and 46, respectively. Such threading may be provided to provide a means by which metallic bushings 38 may be threadedly engaged onto the upper ends 34 and 36. Further, the metallic bushings 38 are provided with an inwardly disposed metallic disk 40, such disk 40 providing a means for protecting the hollow interior of the cylindrical sleeves 12 and 14 during the process of pouring concrete therearound and thereover to keep the interior free of concrete so that electrical conduit or other such structure 18 (FIG. 1) can be fed through the sleeves 12, 14 after pouring of the concrete section and removal of the disk 40 will provide a duct through the entire thickness of the concrete section within which the assembly 10 is encased.

Again, it will be seen in this Figure that the base plate 20 is provided at a position which is approximately one fourth the length of the sleeve member above the bottom end edge of said sleeve member. The base plate 20 comprises a rectangular piece of metal, such as 16 gauge corrugated steel, with a plurality of cutouts 21 equal in number to the number of sleeves to be used therewith, therein. The cutouts 21 preferably have a diameter which is equal to the outer diameter of the sleeves 12, 14, etc., to be used therewith. A plurality of sleeves 12, 14, and in one preferred embodiment, preferably two, are positioned perpendicular to the plane of the base plate 20 and are welded to the base plate 20 once positioned as shown. The base plate 20 is provided with a screw bore or hole 28 at each corner thereof for use in mounting it to the wooden or metal floor support 22, 24 utilized in the concrete forming process.

In this respect, use of the preassembled duct forming sleeve assembly 10 would provide for a savings in manpower, inasmuch as the assembly could be installed prior to pouring of the concrete by the forming crew, rather than by the electricians on a job site, as is now done with the assemblies available today.

As further illustrated, a metallic reinforcing rod 30 is shown to lie in a plane parallel to the plane in which the base plate 20 lies and is shown to join identical positions on each of the cylindrical sleeves 12 and 14 to provide rigidity to the sleeve assembly 10 and further may be utilized to join the assembly 10 to reinforcing mesh or the like (not shown) which are within the concrete structure 16 and which may be tied into the grounding system of the building to provide a means by which the sleeve assembly 10 can be grounded to the ground system of the building.

Turning now to FIG. 3, there is illustrated therein a side view of the duct forming sleeve assembly 10 of the present invention. The sleeves 12 and 14 are joined by the base plate 20 and reinforcing rod 30 in such a manner as to hold the sleeves 12 and 14 parallel to each other in a plane perpendicular to the plane in which the base member 20 and reinforcing rod 30 lie. In such a manner, alignment of the assembly 10 can be maintained with a precise and accurate positioning of the duct forming sleeves 12, 14 during the process of concrete pouring.

In this respect, as has often been the case with prior art duct forming structures, the pouring of concrete can easily move an assembly from side to side, out of alignment, can block the assembly or can altogether destroy the assembly during the pouring process. Thus, with the assembly 10 of the present invention, reinforcement of the sleeves 12, 14 in the form of the base plate 20 and reinforcing rod 30 (as well as a provision of further reinforcing rods 32, 34, illustrated in FIG. 1) provides for a virtually indestructible and permanently positionable duct forming sleeve assembly 10 for use in the formation of concrete structures, such as a concrete foundation.

Turning now to FIG. 4, there is illustrated therein a top plan view of the duct forming sleeve assembly 10 of the present invention which illustrates the parallel nature of the ducts formed by the sleeves 12, 14 of the sleeve assembly 10. Here, the sleeves 12, 14 are shown as capped by the metallic bushings 38. Each metallic bushing 38 may here be considered as having placed within its perimeter and extending across the opening therein a metallic disk 40, made of stainless steel or the like, which has a diameter approximately equal to the outer diameter of the sleeve 12 or 14 such that, when positioned upon or across the open top end edge of the sleeve 12, 14, and the metallic bushing 38 is placed upon the top end edge of each of the metallic sleeves 12 and 14, the hollow interior of the sleeve 12, 14 is closed off so that concrete being poured will not enter the sleeve 12, 14. After the concrete hardens, the disk 40 is removed.

Turning now to FIG. 5, there is illustrated therein a side view of the duct forming sleeve assembly 10 of the present invention wherein there is illustrated an end edge 60 of the base plate 20, an end edge 62 of a reinforcing rod, such as rod 30, and an end on view of the entire assembly 10. As illustrated herein, the base plate 20 is joined to the duct forming sleeve 12 by means of a weld at 70. Also, as illustrated herein, the reinforcing rod 30 is attached to the external surface of a sleeve member 12, 14 by a weld at 72. By the provision of such welds, it is ensured that the sleeves 12 and 14 will be kept uniformly aligned relative to one another, relative to the base plate 20 and relative to the concrete section 16 being formed.

Further, by the provision of the metallic bushings 38 with metallic disk 40 thereacross, debris is kept out of the ducts formed by the sleeves 12, 14 and is kept from falling through the ducts.

In use, the assembly 10, with bushings 38 and disks 40 mounted over the top end edge of each sleeve 12, 14, is mounted by a framing crew worker who is framing out the area where concrete is to be poured by placing the assembly 10 between the frame members for the concrete and the carpenters attaches the assembly 10 to frame structures 22, 24 by placing screws through the screw bores 28 provided in the base plate 20 and thereby attaching the base plate 20 to the frame elements 22, 24. Further, if desired, the reinforcing rod elements 30 may be connected to the grounding system for the building, and may also be tied into or connected to reinforcements, such as mesh, which are typically provided in concrete floors or foundations.

After the assembly 10, or a plurality of assemblies 10, as desired, has been placed according to the structural plans for the building, and the framing has been completed, concrete is poured into the framed out area and over and around the assembly 10. When the concrete hardens, the assembly 10 is encased within the concrete and there is no need to utilize mortar to secure the assembly 10 within the concrete, as with prior art assemblies.

After the concrete has hardened, the metallic bushings 38 and metallic disks 40 therein may be removed as needed from the top end edge of the sleeves 12, 14 and the assembly 10 forms ducts through the thickness of the concrete slab or foundation 16 for the routing of pipes and cables 18.

It is to be noted also, that the duct forming sleeve assembly 10 of the present invention in use eliminates the need for a mortar seal to be placed around the sleeves 12 and 14 since mortar does not provide an adequate fire seal. Also, by the provision of reinforced sleeves 12, 14, which are installed without mortar, the sleeves 12, 14 are strong enough to support the weight of cables or pipes 18 that pass through the sleeves 12, 14, eliminating the lack of strength noted in sleeves presently available.

Modifications can be made to the duct forming sleeve assembly described above, without departing from the teachings of the invention and the invention is only to be limited as necessitated by the accompanying claims.

I claim:

1. A duct forming sleeve assembly for use in a method for providing passageways in poured concrete, such as in a foundation, for the routing of pipes, cables and conduits therethrough, said assembly comprising:

a rectangular base plate member which is positioned within the concrete in a plane parallell to a surface of the concrete for attachment to a wooden or metal floor deck prior to the concrete pouring process, said base plate being provided with mounting means and further being provided with a plurality of cutout areas each of which is capable of accepting a cylindrical sleeve members therein;

a plurality of cylindrical rigid sleeve members, equal to the number of cutout areas within the base plate, each sleeve member being received in a cutout area of said base plate along an axis which is perpendicular to the plane of the base plate; and a reinforcing rod system, comprising a plurality of elongate metal rods, each rod having a length greater than the distance between at least two cylindrical sleeves in a line plus the diameters of those sleeves, said rods being welded at points along their length to each of the at least two sleeve members at an identical position on each of said at least two sleeve members.

2. The assembly of claim 1 wherein each of said cylindrical sleeve members has a threaded configuration along an upper end edge thereof and lower end edge thereof.

3. The assembly of claim 2 also including a plurality of metallic bushings, each bushing being threadedly engagable on one of said threaded end edges of one of said sleeve members.

4. The assembly of claim 3 including a plurality of metallic disks equal in number to said plurality of bushings, each disk being received between one of said bushings and the end of one of said sleeve members for temporarily closing same.

5. The assembly of claim 4 wherein said metal disk inserted in each of said metallic bushings has a diameter of between 4 and 4.5 inches.

6. The assembly of claim 1 wherein said base plate has mounting means at each corner thereof.

7. The assembly of claim 4 wherein said mounting means comprise a bore which is capable of receiving a screw therein.

8. The assembly of claim 1 wherein each of said cylindrical sleeve members is welded to the base plate member at identical positions thereon, the axes of said sleeve members being perpendicular to the base plate member and parallel to each other.

9. The assembly of claim 1 wherein said rod system is capable of being welded to a reinforcing system provided within the concrete structure within which the assembly is encased.

10. The assembly of claim 1 wherein said rod system is capable of connection to a grounding system provided within the concrete structure within which the assembly is encased.

11. The assembly of claim 1 wherein said assembly is adapted to be mounted directly onto a wooden or metal floor deck used in the forming of concrete.

12. The assembly of claim 1 wherein said sleeve member has a length which is slightly greater than the thickness of the concrete within which it is to be encased.

13. The assembly of claim 1 wherein said base plate member is made of metal.

14. The assembly of claim 1 wherein said sleeve members are made of metal.

15. The assembly of claim 1 wherein said reinforcing rods are made of metal.

16. The assembly of claim 1 wherein said sleeve members have an outer diameter of approximately 4.5 inches and an inner diameter of approximately 4 inches.

17. The assembly of claim 1 wherein said base plate member is preferably made of metal, such as 16 gauge corrugated steel.

18. The assembly of claim 1 wherein the axes of the parallel sleeves are approximately 6.5 inches apart.

19. The assembly of claim 1 wherein said sleeve members are approximately 12 inches long.

20. The assembly of claim 19 wherein said base plate member, when used in association with 12 inch long sleeve members, is positioned along said sleeve members at a distance of approximately 3 inches from the bottom end edge of said sleeve members.

21. The assembly of claim 19 wherein said reinforcing rod elements are, when used in association with 12 inch long sleeve members, positioned approximately 5.5 inches from the top end edge of said sleeve members.

22. A method for providing passageways in concrete structures for routing of pipes, cables or conduits therethrough utilizing a duct forming sleeve assembly including the steps of:

forming a plurality of sleeve assemblies each comprising:
a rectangular base plate member which is positioned within the concrete in a plane parallel to a surface of the concrete for attachment to a wooden or metal floor deck prior to the concrete pouring process, said base plate being provided with mounting means and further being provided with a plurality of cutout areas each of which is capable of accepting a cylindrical sleeve member therein; a plurality of cylindrical rigid sleeve members, equal to the number of cutout areas within the base plate, each sleeve member being received in a cutout area of said base plate along an axis which is perpendicular to the plane of the base plate; and a reinforcing rod system, comprising a plurality of elongate metal rods, each rod having a length greater than the distance between at least two cylindrical sleeves in a line plus the diameters of those sleeves, said rods being welded at points along their length to each of the at least two sleeve members at an identical position on each of said at least two sleeve members;
constructing a concrete form by arranging forming frame members into a framework;
placing said duct forming sleeve assemblies at predetermined positions along the framework and attaching each assembly to the forming frame members; and
pouring concrete into the framework.

23. The method of claim 22 wherein said sleeves are provided with covering means, said method further comprises the step of removing the covering means from said sleeve after the concrete hardens to provide a duct system through the poured concrete structure.

* * * * *